(12) United States Patent
Guenther et al.

(10) Patent No.: US 9,693,500 B2
(45) Date of Patent: Jul. 4, 2017

(54) FILAMENT CUTTERHEAD FOR A BRUSHCUTTER

(71) Applicant: Andreas Stihl AG & Co. KG, Waiblingen (DE)

(72) Inventors: David Guenther, Waiblingen (DE); Thomas Hauber, Aalen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 138 days.

(21) Appl. No.: 14/697,473

(22) Filed: Apr. 27, 2015

(65) Prior Publication Data
US 2015/0305234 A1 Oct. 29, 2015

(30) Foreign Application Priority Data

Apr. 26, 2014 (DE) .................. 10 2014 006 057

(51) Int. Cl.
*A01D 34/416* (2006.01)

(52) U.S. Cl.
CPC ....... *A01D 34/4167* (2013.01); *A01D 34/416* (2013.01); *A01D 34/4165* (2013.01)

(58) Field of Classification Search
CPC .............. A01D 34/416; A01D 34/4165; A01D 34/4167
USPC ........................................................ 30/276
See application file for complete search history.

(56) References Cited

U.S. PATENT DOCUMENTS

| 4,065,913 | A | | 1/1978 | Fisher et al. | |
|---|---|---|---|---|---|
| 4,190,954 | A | * | 3/1980 | Walto | A01D 34/4166 30/347 |
| 4,571,831 | A | * | 2/1986 | White, III | A01D 34/416 30/276 |
| 5,359,777 | A | * | 11/1994 | Bauer | A01D 34/416 30/276 |
| 5,979,064 | A | * | 11/1999 | Kitz | A01D 34/4165 30/276 |
| 6,519,857 | B1 | | 2/2003 | Proulx et al. | |
| 7,966,736 | B2 | * | 6/2011 | Arnetoli | A01D 34/4163 30/276 |
| 8,341,847 | B2 | * | 1/2013 | Kato | A01D 34/416 30/276 |
| 9,320,195 | B2 | * | 4/2016 | Weimer | A01D 34/4166 |
| 2004/0237315 | A1 | | 12/2004 | Alliss | |
| 2013/0283623 | A1 | * | 10/2013 | Pellenc | A01D 34/416 30/276 |

(Continued)

FOREIGN PATENT DOCUMENTS

EP 2 936 960 A1 * 4/2015 ........... A01D 34/416

*Primary Examiner* — Hwei C Payer
(74) *Attorney, Agent, or Firm* — Walter Ottesen, P.A.

(57) ABSTRACT

A filament cutterhead for a brushcutter is able to be driven in a rotatable manner during operation in a rotational direction about a rotational axis. The filament cutterhead has a base body on which at least one cutting filament is retained and which has a lower face facing the ground during operation. The cutting filament extends from an outer face of the base body through an opening as far as an inner region of the base body which is open toward the lower face of the base body. In order to achieve a low degree of soiling of the filament cutterhead during operation, a shield element is provided in the inner region and the leading portion of the cutting filament in the inner region is arranged in the slipstream of the shield element relative to the rotational direction.

15 Claims, 6 Drawing Sheets

(56) References Cited

U.S. PATENT DOCUMENTS

2015/0305234 A1\* 10/2015 Guenther .......... A01D 34/4165
30/276

\* cited by examiner

FILAMENT CUTTERHEAD FOR A BRUSHCUTTER

CROSS REFERENCE TO RELATED APPLICATION

This application claims priority of German patent application no. 10 2014 006 057.8, filed Apr. 26, 2014, the entire content of which is incorporated herein by reference.

BACKGROUND OF THE INVENTION

A filament cutterhead for a brushcutter is disclosed in U.S. Pat. No. 6,519,857, the filament cutterhead having a base body in which two cutting filaments may be inserted from opposing sides from the outer face of the filament cutterhead. The cutting filaments are retained on the filament cutterhead via pivotable pawls. The free ends of the cutting filaments protrude into an inner space which is open toward the lower face of the filament cutterhead. In order to remove the cutting filaments from the filament cutterhead, for example for replacement, the internal free ends of the cutting filaments may be gripped by the operator and the cutting filaments pulled inwardly.

It has been shown that the inner region of the base body which is open toward the lower face of the base body may become very soiled during operation. Cut material, for example cut blades of grass, may remain suspended at the free ends of the cutting filaments and promote the accumulation of further soiled material.

SUMMARY OF THE INVENTION

It is an object of the invention to provide a filament cutterhead for a brushcutter of the generic type which has less tendency to become soiled.

A shield element is provided in the inner region, wherein the portion of the cutting filament extending in the inner region is arranged in the slipstream of the shield element relative to the rotational direction. It has been shown that by means of a shield element, with the cutting filament extending in the slipstream thereof, the tendency of the filament cutterhead to become soiled may be markedly reduced. The shield element conducts soiled material, such as for example cut material or the like, past the portion of the cutting filament arranged in the inner region and substantially prevents soiled material from being able to accumulate in the region of the cutting filament in the inner region. As a result, the tendency for the filament cutterhead to become soiled may be markedly reduced in a simple manner. Soiled material on the filament cutterhead may cause an imbalance of the filament cutterhead and, as a result, increased wear of the filament cutterhead. This may be avoided in a simple manner by the configuration of the filament cutterhead which is provided by the invention.

Advantageously, the shield element is arranged adjacent to the longitudinal side, which is the leading side during operation, of the portion of the cutting filament extending in the inner region. The lower edge of the shield element facing the lower face of the base body in this case advantageously encloses an angle of at most approximately 30° with the longitudinal direction of the cutting filament. The angle which the lower edge encloses with the longitudinal direction of the cutting filament is, in particular, at most approximately 20°. An approximately parallel arrangement of the lower edge of the shield element and the longitudinal direction of the cutting filament is regarded as particularly advantageous. The lower edge of the shield element in this case is the region in which the shield element merges with the top surface or abuts the top surface. With a curved configuration of the shield element, the lower edge is the line at which the shield element has the smallest spacing from the lower face of the base body and merges with the top surface.

In order to achieve a particularly low degree of soiling of the filament cutterhead during operation, it is provided that the spacing of the lower edge of the shield element, facing the lower face of the base body, from the plane of the lower face of the base body is less than the spacing of the portion of the cutting filament arranged adjacent to the shield element. The lower edge of the shield element accordingly protrudes downwardly beyond the cutting filament. The plane of the lower face of the base body in this case is a plane in which the lower face of the base body is located. If the filament cutterhead is placed on a planar horizontal surface, the plane corresponds to the lower face of the planar horizontal surface. The plane of the lower face is advantageously located perpendicular to the rotational axis of the filament cutterhead.

It may also be provided that the shield element does not protrude downwardly beyond the line but terminates in the same plane as the line, aligned perpendicular to the rotational axis, or that a partial region of the line protrudes downwardly beyond the shield element. The arrangement of the portion of the cutting filament in the slipstream of the shield element is thus advantageously achieved by a suitable choice of the contour of the shield element.

Advantageously, the spacing of the shield element from the longitudinal side of the cutting filament, which is the leading side in the rotational direction, is at most 5 times the projection of the shield element, that is, the difference between the spacing of the portion of the cutting filament arranged adjacent to the shield element from the plane of the lower face and the spacing of the lower edge of the shield element from the plane of the lower face. As a result, an arrangement of the cutting filament in the slipstream of the shield element may be achieved in a simple manner.

It is provided that the inner region on the side remote from the lower face, that is, at the top during operation, is defined by a top surface. In order to achieve a low air resistance of the filament cutterhead and a favorable flow guidance, it is provided that the top surface has at least one coil-shaped portion which is arranged in the leading direction relative to the shield element and which the shield element adjoins. The coil-shaped portion in this case is a portion in which the spacing of the top surface from the plane of the lower face in the rotational direction is increased. The spacing in this case may constantly increase so that in the peripheral direction the coil-shaped portion is configured as a ramp. The gradient of the top surface then extends in a linear manner in the coil-shaped portion. However, it may also be provided that the coil-shaped portion extends in a curved manner in the peripheral direction, that is, in a circular section about the rotational axis. The gradient of the top surface then extends in a non-linear manner in the coil-shaped portion.

Advantageously, the coil-shaped portion extends over an angular range about the rotational axis which is at least approximately 30%, in particular at least approximately 50%, preferably at least approximately 70% of the angular spacing between cutting filaments adjacent in the peripheral direction. With two cutting filaments, which have an angular spacing of approximately 180° from one another, the coil-shaped portion accordingly advantageously extends over a circumferential angle of at least approximately 60°, in particular over at least approximately 90°, particularly advantageously over approximately 126°. The angular spacing in this case is respectively measured from the longitudinal axis of the cutting filaments. With a different number of cutting filaments, the angular range over which the coil-shaped portion extends is advantageously accordingly adapted.

A simple configuration results when the shield element is a shield wall. In order to avoid the accumulation of soiled material on the filament cutterhead, it is advantageously provided that the peripheral wall, which radially defines the inner region to the outside relative to the rotational axis, widens in at least one portion in the direction of the plane of the lower face of the base body. As a result, it is facilitated that soiled material which has accumulated in the inner region is conducted by the action of centrifugal force from the peripheral wall out of the inner region and may be projected downwardly out of the filament cutterhead. Particularly advantageously, the peripheral wall advantageously widens in at least one portion adjacent to the lower face. Advantageously, the cross section of the inner region is circular and the diameter of the inner region, measured perpendicular to the rotational axis, increases in the at least one portion in which the peripheral wall widens, in the direction of the plane of the lower face of the base body. Advantageously, the diameter of the inner region on the lower face of the base body is at least approximately 120%, preferably at least approximately 130%, of the diameter of the inner region on the lower edge of the shield element facing the lower face of the base body. As a result, a relatively large opening of the inner region is produced at the bottom which prevents the accumulation of soiled material in the inner region and encourages soiled material to drop off downward. The peripheral wall is advantageously configured in the at least one portion as a cone portion, wherein the cone widens toward the lower face. Soiled material in the inner region is moved radially outwardly during operation relative to the rotational axis due to the centrifugal force. The effect of the cone shape of the peripheral wall is that soiled material, which is moved outwardly due to the centrifugal force, is conducted downwardly out of the inner region.

In order to achieve a defined position of the portion of the cutting filaments arranged in the inner region, it is advantageously provided that the cutting filament with its end protruding in the inner region bears against a stop of the filament cutterhead. Advantageously, the stop is aligned approximately perpendicular to the longitudinal direction of the cutting filaments. Also, however, a slightly inclined arrangement of the stop may be advantageous.

In order to achieve a secure fixing of the cutting filament on the base body, it is advantageously provided that the cutting filament is retained by a clamping device on the base body, the clamping device blocking a movement of the cutting filament relative to the outer face of the base body. In order to permit a simple replacement of the cutting filament, it is advantageously provided that the clamping device permits a movement of the cutting filament in the direction of the inner region. As a result, the cutting filament may be gripped by the operator in the inner region and pulled inwardly. In order to permit simple gripping of the cutting filament in the inner region, it is advantageously provided that the shield element forms with the top surface of the inner region a receiver for the cutting filament, which is at least partially open toward the side which is the trailing side during operation. On the side of the cutting filament, which is the trailing side during operation, the accumulation of soiled material due to the position in the slipstream is substantially avoided, so that this region may be open for easy accessibility to the cutting filament. The receiver in this case is at least partially, in particular fully, open toward the trailing side during operation. Preferably, the receiver is open via a region toward the trailing side during operation which permits simple gripping of the cutting filament by the operator, that is, for example is at least the width of a finger.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
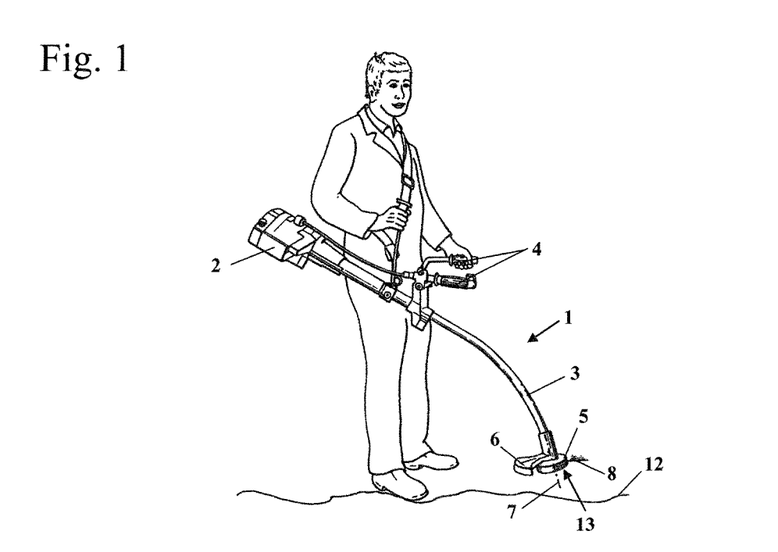
FIG. 1 shows a schematic of a brushcutter held by an operator.

FIG. 1 shows a brushcutter 1 which is held by an operator. The brushcutter 1 has a housing 2 in which a drive motor is arranged. The brushcutter 1 has a shaft 3 which is arranged with one end on the housing 2 and the other end thereof carries a filament cutterhead 5. A drive shaft protrudes through the shaft 3 driven by the drive motor arranged in the housing 2, the drive shaft rotatably driving the filament cutterhead 5 about a rotational axis 7. During operation, the filament cutterhead 5 is covered on the side facing the operator by a protective cover 6. The filament cutterhead 5 has a filament or cutting line 8 which serves for cutting material to be cut, such as grass, brush or the like. The filament cutterhead 5 has a lower face 13 facing the ground 12 during operation, the lower face being arranged on the side of the filament cutterhead 5 remote from the shaft 3. For guiding the brushcutter 1 during operation, handles 4 are provided, the handles being arranged in the embodiment on a handlebar which is fastened to the shaft 3.

Figure 2:
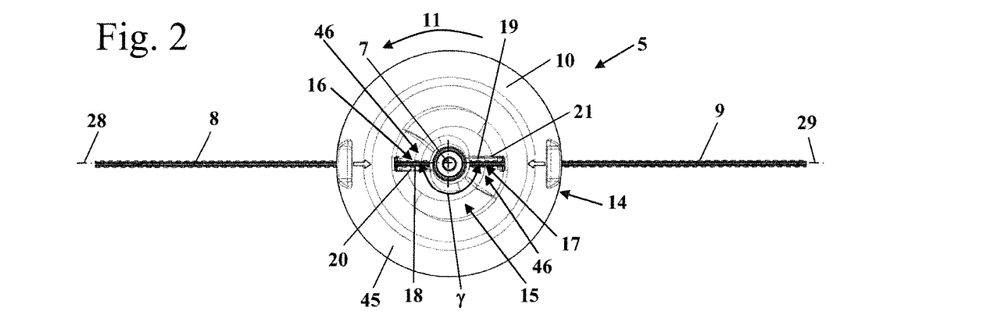
FIG. 2 shows a view from below of the filament cutterhead of the brushcutter of FIG. 1.

FIG. 2 shows the filament cutterhead 5 viewed from the lower face 13. Two cutting filaments 8 and 9 are arranged opposing one another on the filament cutterhead 5. In the embodiment shown, the longitudinal direction 28 of the cutting filament 8 and the longitudinal direction 29 of the cutting filament 9 are aligned coaxially to one another and intersect the rotational axis 7. However, it may also be provided that the longitudinal directions 28 and 29 are offset laterally to one another. The two cutting filaments 8 and 9 have an angular spacing γ relative to one another which is 180°. The angular spacing γ in this case is measured between the longitudinal directions (28, 29) of the cutting filaments (8, 9). Also a further angular spacing γ and/or a further number of cutting filaments may be advantageous. The filament cutterhead 5 has a base body 10 which is rotatably driven in a rotational direction 11 about the rotational axis 7. The base body 10 has an outer face 14 which is separated by an annular portion 45, also shown in FIG. 3, from an inner region 15. The inner region 15 is open toward the lower face 13 (FIG. 1). The filament cutterhead 5 has openings 23 and 22, shown in FIG. 3, which pass through the annular portion 45 and through which the cutting filaments 8 and 9 protrude from the outer face 14 into the inner region 15. A hub 24, shown in FIGS. 3 and 4, protrudes into the inner region 15, the hub serving for bearing the filament cutterhead 5 on a drive shaft of the brushcutter 1.

As FIG. 2 shows, a portion 16 of the cutting filament 8 protrudes into the inner region 15. Accordingly, a portion 17 of the cutting filament 9 protrudes into the inner region 15. A shield wall 20 is provided in the inner region 15, the shield wall leading in the rotational direction 11 relative to the portion 16. The shield wall 20 is arranged adjacent to the leading longitudinal side 18 of the portion 16 of the cutting filament 8. In the embodiment shown, the shield wall 20 is located parallel to the longitudinal side 18. Accordingly, a shield wall 21 is provided in the leading direction relative to the portion 17 of the cutting filament 9, the shield wall being arranged adjacent to a leading longitudinal side 19 of the cutting filament 9 and extending parallel thereto. The shield walls (20, 21) are of planar configuration.

Figure 3:
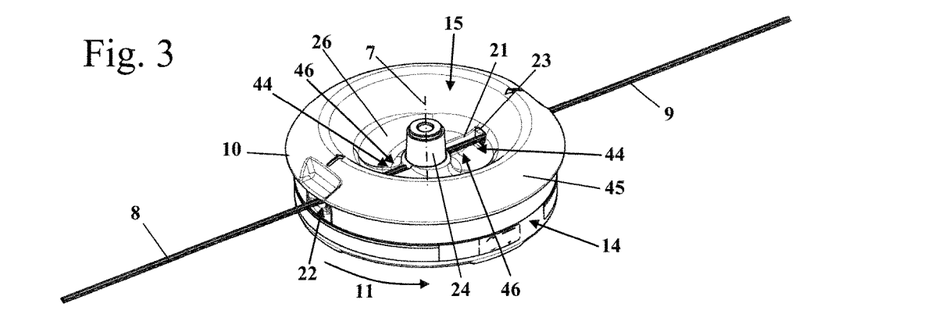
FIGS. 3 and 4 show perspective views of the filament cutterhead.
Figure 4:
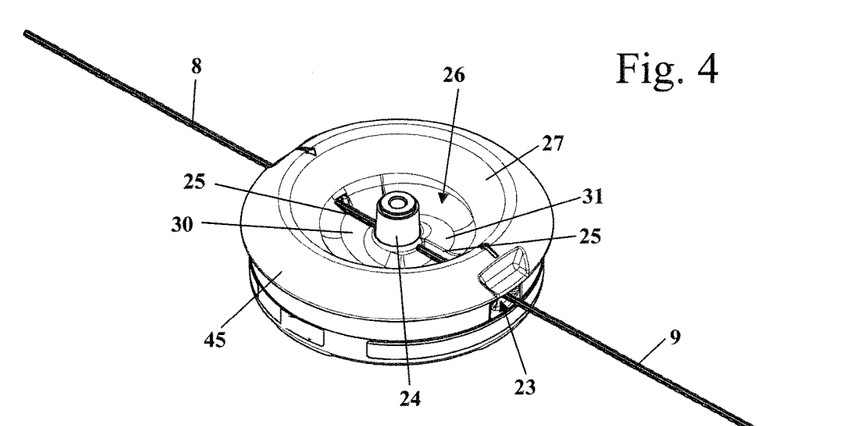
Figures 5, 6:
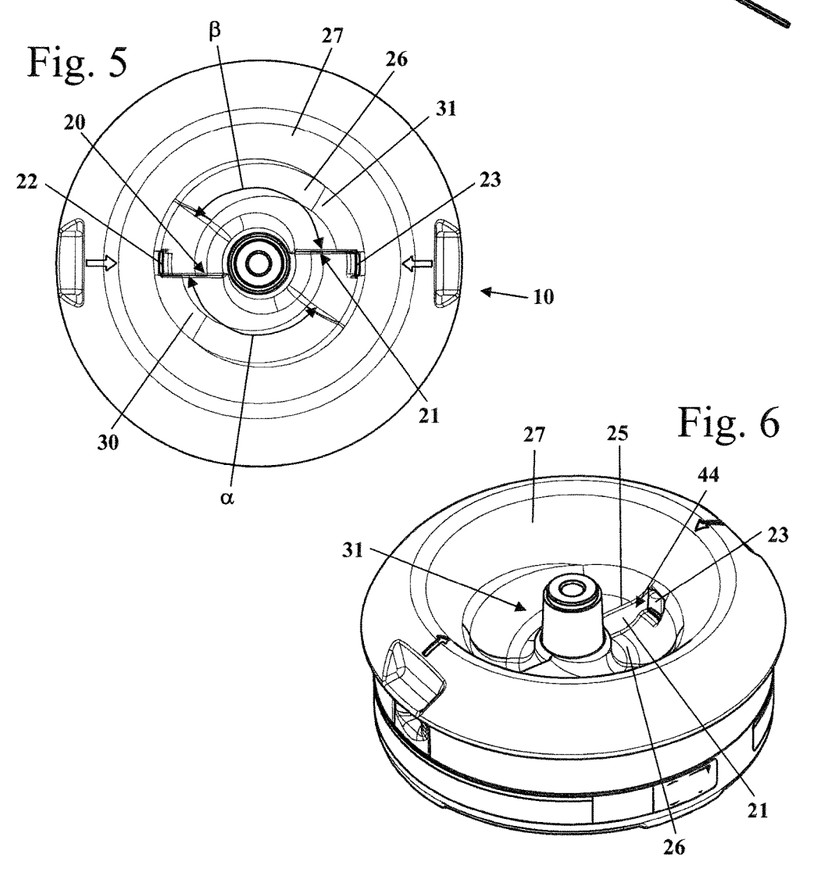
FIG. 5 shows a view from below of the base body of the filament cutterhead without the cutting lines arranged thereon.
FIGS. 6 and 7 show perspective views of the base body of FIG. 5.
Figure 7:
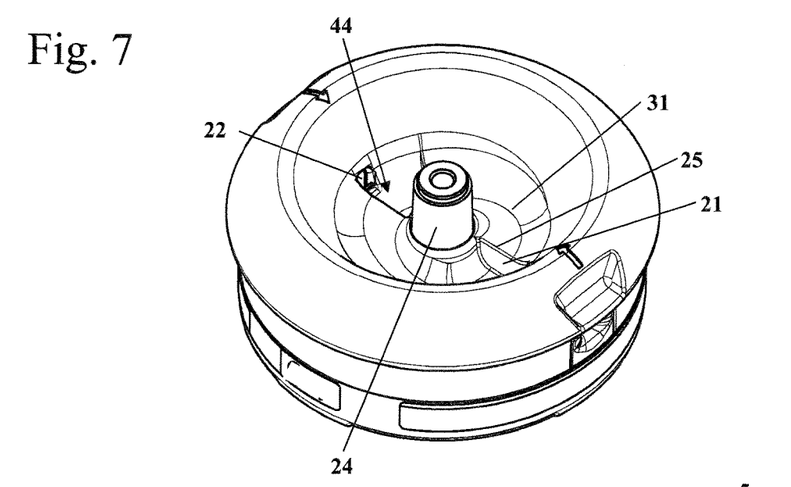

As FIGS. 3 and 4 show, the inner region 15 is defined at the top, that is, on the side remote from the lower face 13 by a top surface 26. The top surface 26 forms adjacent to the opening 22 with the shield wall 20 a receiver 44 for the portion 16 of the cutting filament 8. With the shield wall 21, the top surface 26 in the region of the opening 23 forms a corresponding receiver 44 for the portion 17 of the cutting filament 9. The receivers 44 in each case are open toward the trailing side 46 in the rotational direction 11. The configuration of the receivers 44 is also shown in FIGS. 6 and 7. The receivers 44 in each case adjoin the openings (22, 23), the cutting filaments 8 and 9 entering the inner space 15 through the openings and extending approximately as far as the hub 24.

A coil-shaped portion 30 is arranged so as to be leading in the rotational direction 11 relative to the shield wall 20, the coil-shaped portion being formed by the top surface 26 and which extends over an angle α shown in FIG. 5. The angle α is advantageously at least approximately 30%, in particular at least approximately 50%, preferably at least approximately 70% of the angular spacing γ shown in FIG. 2 between the cutting filaments 8 and 9. In the embodiment shown, the angle α is approximately 130° to approximately 140°.

A coil-shaped portion 31 is provided so as to be leading relative to the shield wall 21, the coil-shaped portion extending over an angle β. The angle β is also at least approximately 30%, in particular at least approximately 50%, preferably at least approximately 70% of the angular spacing γ. In the embodiment shown, the angles α and β are of the same size.

As FIGS. 4 and 5 show, the inner region 15 is defined outwardly by a peripheral wall 27 which is formed from the inner face of the annular portion 45. The peripheral wall 27 widens in the direction of the lower face 13 (FIG. 1) of the filament cutterhead 5. As FIGS. 3, 4, 6 and 7 show, the top surface 26 extends into the coil-shaped portions 30 and 31 in the peripheral direction in a coil-shaped or spiral-shaped manner. The spacing of the top surface 26 from the lower face 13 of the filament cutterhead 5 is reduced in the coil-shaped portions 30 and 31 as far as a lower edge 25 of the shield walls 20 and 21. On the lower edge 25, the shield walls (20, 21) have the smallest spacing from the lower face 13.

The filament cutterhead is configured to be axially symmetrical to the rotational axis 7. The shield walls 20 and 21, the coil-shaped portions 30 and 31 and the two receivers 44 are in each case configured identically.

Figure 8:
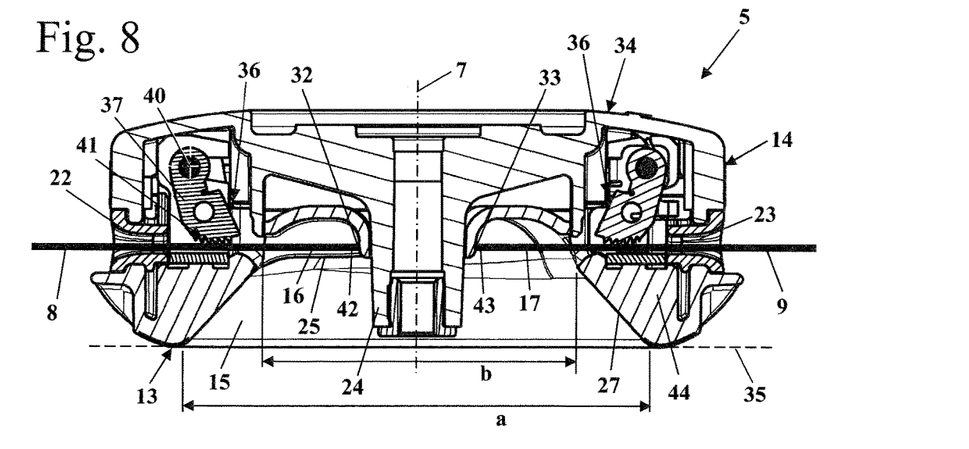
FIG. 8 shows a section through the filament cutterhead along the line IX-IX in FIG. 12 with the cutting lines arranged thereon.

As FIG. 8 shows, the cutting filaments 8 and 9 are retained in the base body 10 by clamping devices 36. The clamping devices 36 have in each case a pivotably mounted pawl 37 which is pivotable about a pivot axis 40. The pivot axis 40 is arranged so that with an inward pivoting movement relative to the rotational axis 7 of the filament cutterhead 5 the pawls 37 reduce the clamping action and release the cutting filaments (8, 9). A movement of the cutting filaments 8 and 9 radially outwardly effects a reinforcement of the clamping action of the clamping devices 36. In the region of the end thereof, the pawls 37 have a retaining structure 41 which in the embodiment shown is formed by a toothed structure. The retaining structure 41 bears against the cutting filaments 8 and 9. As a result, the cutting filaments 8 and 9 are securely held on the clamping devices 36. In order to remove the cutting filaments (8, 9) from the filament cutterhead 5, the portions 16 and 17 may be gripped by the operator and the cutting filaments 8 and 9 pulled inwardly through the clamping devices 36 and removed via the inner region 15.

As FIG. 8 also shows, stops 32 and 33 for the portions 16 and 17 are formed adjacent to the hub 24. The portion 16 of the cutting filament 8, in the view shown, bears with its free end 42 against the stop 32. The portion 17 bears with its free end 43 against the stop 33. The stops 32 and 33 may be advantageously oriented perpendicular to the longitudinal direction (28, 29) (FIG. 2) of the cutting filaments 8 and 9. The stops (32, 33) serve as an aid when setting the cutting circle. The operator may push in two cutting filaments (8, 9) of the same length in each case as far as the stop (32, 33). The outwardly protruding free ends of the two cutting filaments (8, 9) thus have the same spacing from the rotational axis 7. The cutting filaments (8, 9), however, do not necessarily have to be pushed in as far as the stops (32, 33).

Figure 9:
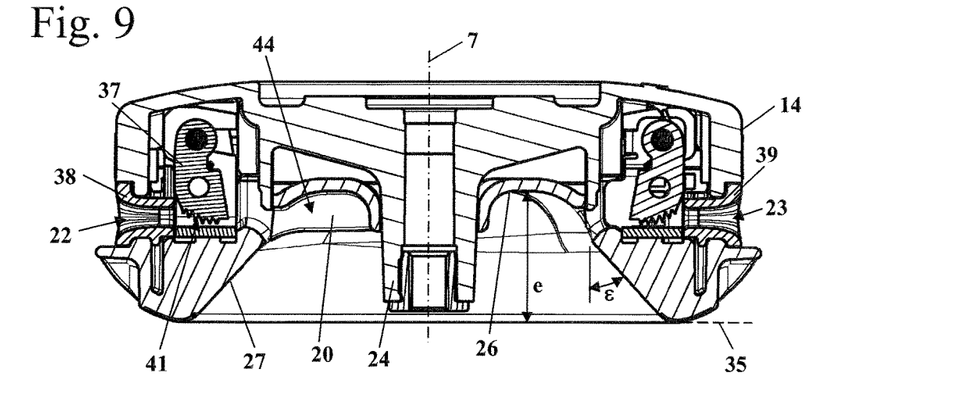
FIG. 9 shows a section through the base body of the filament cutterhead along the line IX-IX in FIG. 12 without the cutting lines arranged thereon.

As FIG. 8 also shows, the peripheral wall 27 widens in the direction of a plane 35 of the lower face 13. If the filament cutterhead 5 is placed with its lower face 13 on a planar horizontal bearing surface, the plane 35 corresponds to the bearing surface. As FIG. 8 also shows, the filament cutterhead 5 has an upper face 34 remote from the lower face 13 and facing the shaft 3 (FIG. 1). The peripheral wall 27 has in the embodiment a circular cross section. On the edge 25 the inner region 15 has a diameter (b). The diameter (b) in this case is measured on the radial external side of the edge 25. In the plane 35 of the lower face 13, the inner region 15 has a diameter (a) which is considerably greater than the diameter (b). The diameter (a) is advantageously at least approximately 120%, in particular at least approximately 130%, of the diameter (b). As FIG. 9 shows, the peripheral wall 27 forms a cone portion. The cone angle $\epsilon$, that is, the angle which the peripheral wall 27 encloses with the rotational axis 7, is advantageously at least approximately 20°, in particular at least approximately 30°. In the embodiment shown, the cone angle $\epsilon$ is approximately 45°.

Figure 10:
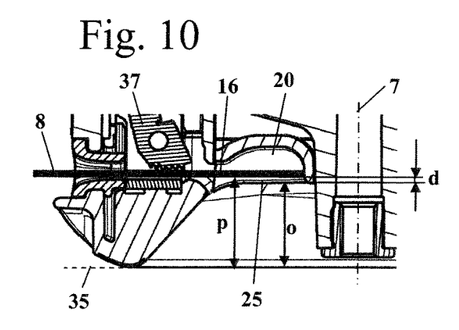
FIG. 10 shows a detail of FIG. 8.

FIG. 9 shows a section through the filament cutterhead 5 directly adjacent to the shield wall 20 and to the shield wall 21 through the receivers 44 for the portions 16 and 17 of the cutting filaments (8, 9). The cutting plane centrally intersects the openings 22 and 23 for the cutting filaments (8, 9). In this region, the top surface 26 has a first spacing (e) from the plane 35. The spacing (e) is considerably greater than the spacing (p) shown in FIG. 10 of the portion 16 of the cutting filament 8, arranged in the inner region 15, from the plane 35. As a result, in the view in FIG. 9, for removing the cutting filament (8, 9), an operator is able to grip the portion 16 or 17 of the cutting filament with the finger and pull the cutting filament downward. As FIG. 10 also shows, the spacing (o) of the lower edge 25 of the shield wall 20 from the plane 35 is smaller than the spacing (p). As a result, the shield wall 20 protrudes by a projection (d) downwardly beyond the cutting filaments 8. The spacings (e), (p) and (o) are in this case measured parallel to the rotational axis 7. In the shield wall 20 of planar configuration, the lower edge 25 of the shield wall 20 is the edge of the shield wall 20 on which the shield wall 20 lies adjacent to the top surface 26. The base body 10 has adjacent to its outer face 14 a sleeve 38 which defines the opening 22 for the cutting filament 8, as well as a sleeve 39 which defines the opening 23 for the cutting filament 9.

Figure 11:
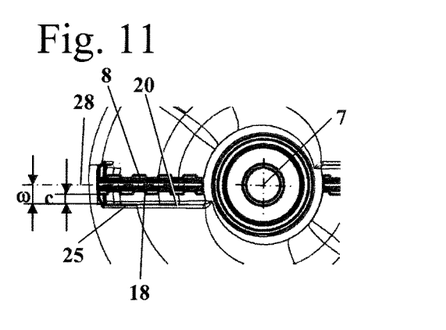
FIG. 11 shows an enlarged view of the inner region of the filament cutterhead of FIG. 2.
Figure 12:
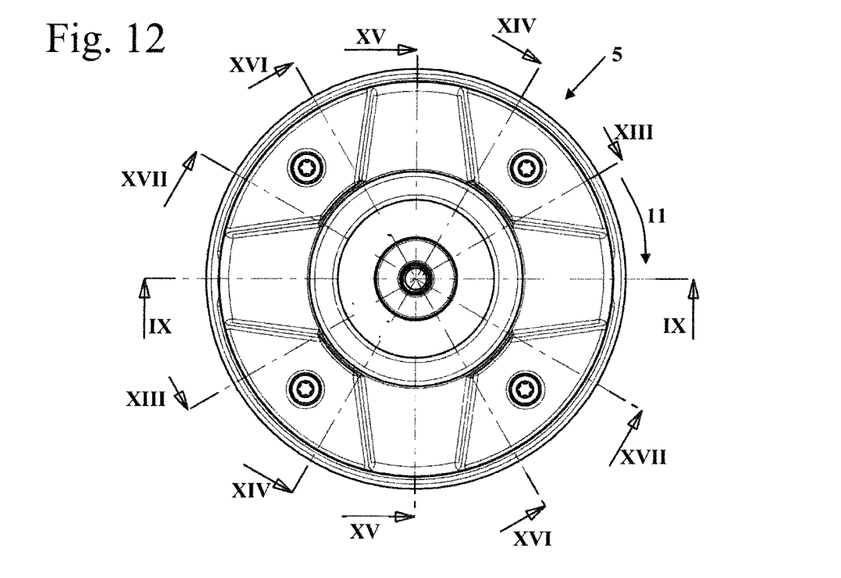
FIG. 12 shows a view from above of the filament cutterhead without the cutting lines arranged thereon.
Figure 13:
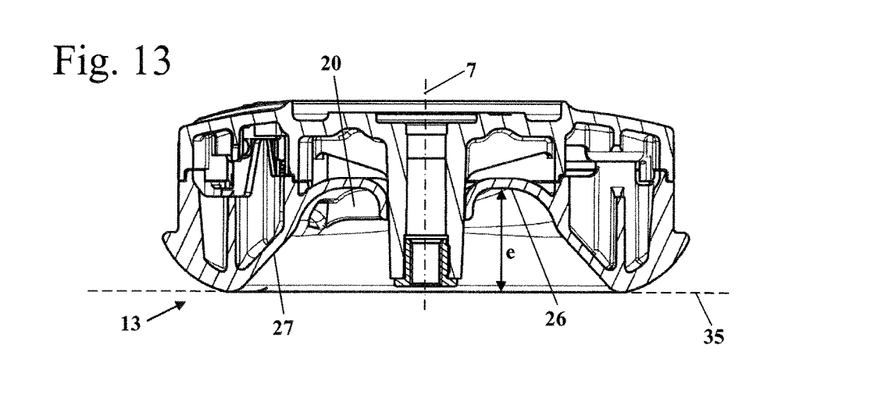
FIG. 13 shows a section along the line XIII-XIII in FIG. 12.

As FIG. 11 shows, the longitudinal side 18 of the cutting filament 8 has a spacing (c) from the shield wall 20 which is very small. The spacing (c) in the embodiment is larger than the projection (d). The spacing (c) is measured in a plane arranged perpendicular to the rotational axis 7. The longitudinal side 18 extends in the embodiment approximately parallel to the lower edge 25. Advantageously, the longitudinal direction (28, 29) of the cutting filament (8, 9) encloses with the lower edge 25 in the cutting plane perpendicular to the rotational axis 7 an angle $\omega$ of at most approximately 30°, in particular at most approximately 20°. Particularly preferred is an approximately parallel arrangement.

FIGS. 13 to 17 show the configuration of the coil-shaped portions 30 and 31 in detail. In the section shown in FIG. 13 with a small angular spacing in the rotational direction downstream of the shield walls 20 and 21, the top surface 26 has a spacing (e) from the plane 35 which corresponds to the spacing (e) directly adjacent to the shield wall 20 and 21 (FIG. 9). The spacing (e) is accordingly constant over one region. The cutting plane in FIG. 13 has an angular spacing of 30° counter to the rotational direction 11 relative to the cutting plane in FIG. 9.

Figure 14:
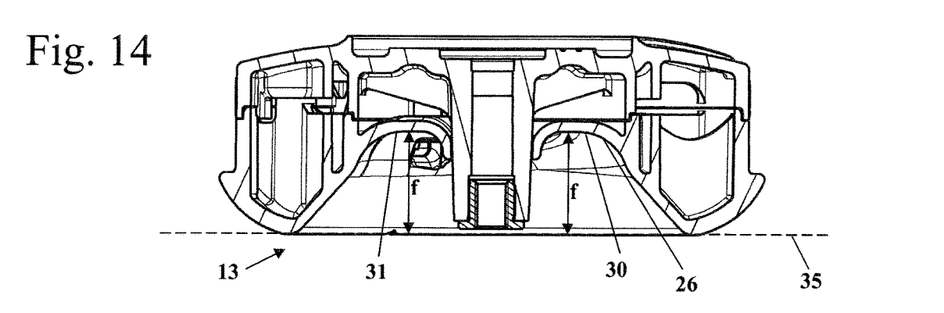
FIG. 14 shows a section along the line XIV-XIV in FIG. 12.

FIG. 14 shows a section which is at an angular spacing of 60° counter to the rotational direction 11 relative to the section shown in FIG. 9 through the openings 22 and 23. In the sectional view shown in FIG. 14 the coil-shaped portions 30 and 31 start, so that the spacing of the top surface 26 from the plane 35 is reduced. In the sectional view shown in FIG. 14, the coil-shaped portions 30 and 31 have a spacing (f) from the plane 35 measured parallel to the rotational axis 7 which is slightly smaller than the spacing (e).

Figure 15:
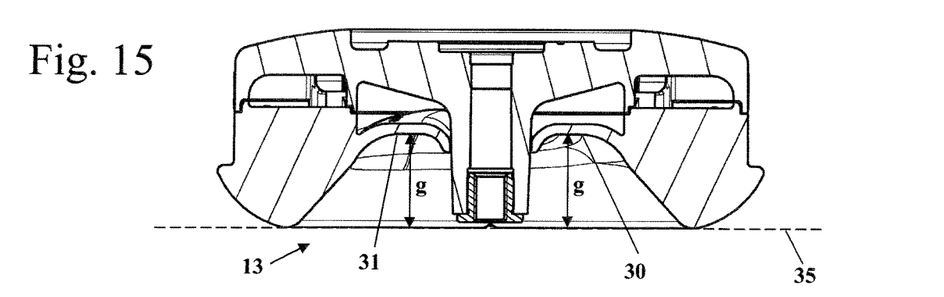
FIG. 15 shows a section along the line XV-XV in FIG. 12.

FIG. 15 shows a section at an angular spacing of 90° relative to the section through the cutting filaments 8 and 9 and relative to the section in FIG. 9. In this cutting plane, the coil-shaped portions 30 and 31 have a spacing (g) from the plane 35 which is considerably smaller than the spacing (f).

Figure 16:
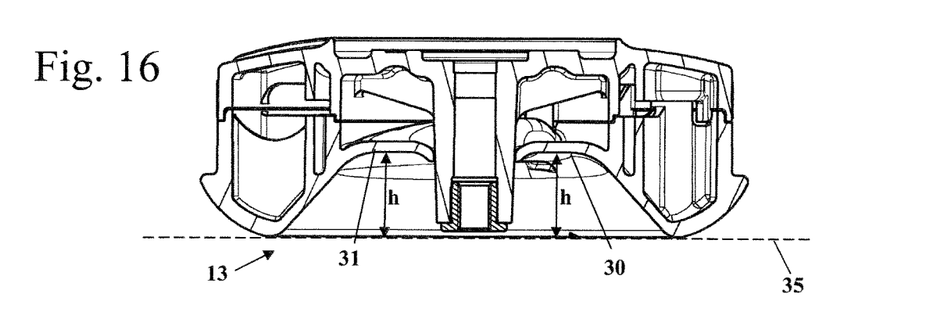
FIG. 16 shows a section along the line XVI-XVI in FIG. 12.

FIG. 16 shows a section at an angular spacing of a further 30° counter to the rotational direction 11 relative to the section in FIG. 15. In this cutting plane, the coil-shaped portions 30 and 31 have a spacing (h) from the plane 35 which is smaller than the spacing (g).

Figure 17:
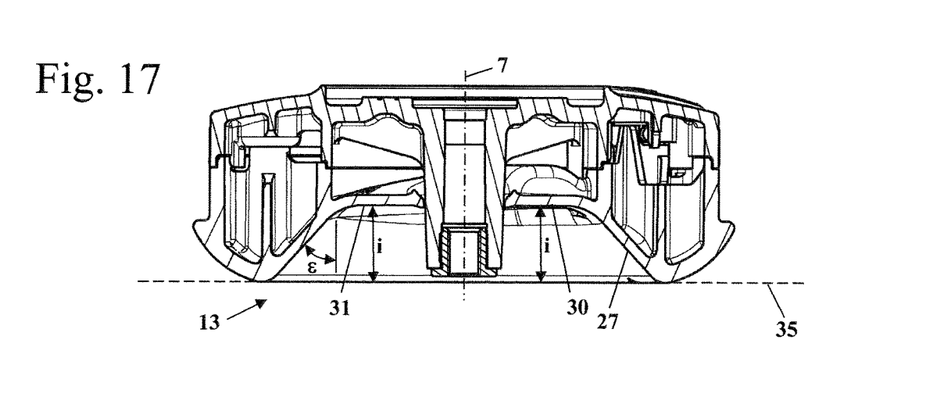
FIG. 17 shows a section along the line XVII-XVII in FIG. 12.

FIG. 17 shows a section in the rotational direction 11 directly downstream of the shield walls 20 and 21. In this cutting plane, the coil-shaped portions 30 and 31 have a spacing (i) from the plane 35 which is smaller than the spacing (h) and only slightly larger than the spacing (o) of the lower edge 25 from the plane 35 shown in FIG. 10. The spacing of the coil-shaped portions 30 and 31 from the plane 35 of the lower face 13 reduces accordingly counter to the rotational direction 11. If the filament cutterhead 5 is moved in the rotational direction 11, for a fixed element arranged in the region of the top surface 26 and the coil-shaped portions 30 and/or 31, the spacing of the top surface 26 from the plane 35 reduces continuously until the lower edge 25 is reached. As a result, cut material accumulating on the top surface 26 is forced downward. The portions 16 and 17 of the cutting filaments 8 and 9 in this case are located downstream of the shield walls 20 and 21, that is, in the slipstream of the shield walls 20 and 21. As a result, it is substantially avoided that soiled material, such as for example cut material, is able to accumulate on the filament cutterhead 5.

In FIG. 17, the cone angle $\epsilon$ is also shown. The peripheral wall 27 extends in this cutting plane from the plane 35 as far as the vicinity of the top surface 26 inclined at the cone angle $\epsilon$ relative to the rotational axis 7. The peripheral wall 27 in this case merges in a rounded manner with the top surface 26.

Figure 18:
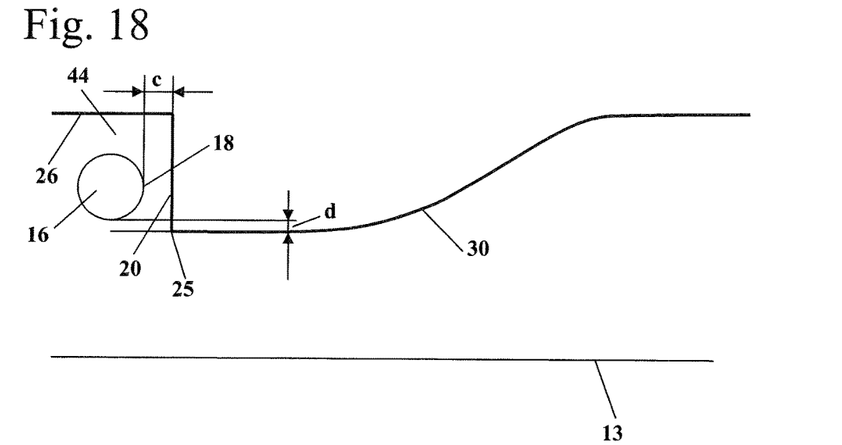
FIG. 18 shows a schematic view of the path of the top surface in the peripheral direction of the filament cutterhead of FIGS. 2 to 17.

FIG. 18 shows the spacing (c) and the projection (d) in a schematic view which shows a section through the top surface 26 in the peripheral direction, that is, in a circular manner about the rotational axis 7. As FIG. 18 shows, the projection (d) is smaller than the spacing (c). The spacing (c) is advantageously at most five times the projection (d), that is, the difference between the spacing (o) of the portion 16 of the cutting filament 8 arranged adjacent to the shield wall 20 from the plane 35 and the spacing (p) of the lower edge 25 of the shield wall 20 from the plane 35. The spacing (c) in this case is measured from the leading longitudinal side 18 of the portion 16 of the cutting filament 8. As FIG. 18 also shows, the shield wall extends perpendicularly and thus forms with the top surface 26 on the receiver 44 an angle of 90°.

Figure 19:
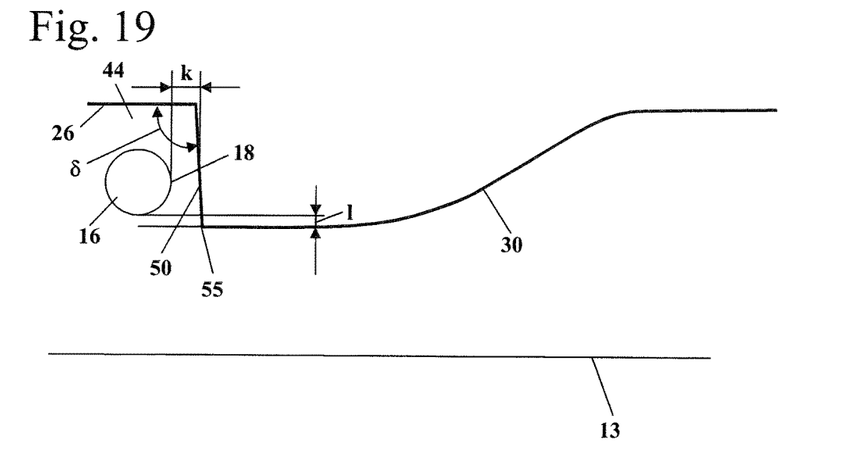
FIGS. 19 and 20 show schematic views corresponding to FIG. 18 for embodiments of the shield element.
Figure 20:
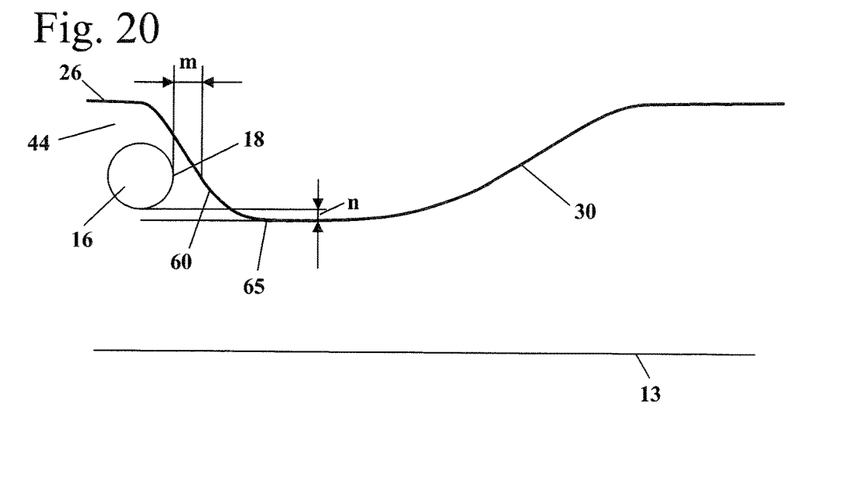

FIGS. 19 and 20 show embodiments for shield walls 50 and 60. The shield wall 50 shown in FIG. 19 is inclined relative to the top surface 26 in the region of the receiver 44 by an angle $\delta$ which is greater than 90°. The angle $\delta$ may, for example, be approximately 92°, up to approximately 120°. A larger angle $\delta$ may also be advantageous. The shield wall 50 in this case is configured as a planar wall. The shield wall 50 has a spacing (k) from the longitudinal side 18 of the portion 16, the spacing being measured perpendicular to the longitudinal side 18 and in a plane perpendicular to the rotational axis 7. The shield wall 50 has a lower edge 55 which projects over the portion 16 by a projection (l). The spacing (k) is advantageously larger than the projection (l) and at most is five times the projection (l). The lower edge 55 is the edge on which the planar shield element 50 merges with the top surface 26.

FIG. 20 shows a further embodiment of a shield wall 60. The shield wall 60 is not configured as a planar wall but extends in the peripheral direction in a curved manner relative to the rotational axis 7. The shield wall 60 in this case is inclined relative to the top surface 26 on the receiver 44 by an angle of considerably more than 90°. The shield wall 60 merges in a curved manner with the top surface 26 on the receiver 44 and with the coil-shaped portion 30. The shield wall 60 has a lower edge 65 which is the region of the shield wall 60 which has the smallest spacing from the plane 35 of the lower face 13. On the lower edge 65 the shield wall 60 merges with the coil-shaped portion 30 of the top surface 26. The lower edge 65 has a projection (n) relative to the portion 16 of the cutting filament 8. The longitudinal side 18 of the portion 16 of the cutting filament 8 has a spacing (m) from the shield wall 60, the spacing being measured perpendicular to the longitudinal direction 18 and in a plane perpendicular to the rotational axis 7. The spacing (m) is at most five times the projection (n).

It is understood that the foregoing description is that of the preferred embodiments of the invention and that various changes and modifications may be made thereto without departing from the spirit and scope of the invention as defined in the appended claims.

What is claimed is:

1. A cutterhead for a brushcutter, the cutterhead being rotatably driveable in a rotational direction about a rotational axis during operation, the cutterhead comprising:
   a cutting filament;
   a clamping arrangement;
   a base body having a lower face and being configured to hold said cutting filament via said clamping arrangement;
   said lower face being configured to face toward the ground during operation;
   said base body defining an outer face and having an inner region open to said lower face thereof;
   said base body further having an opening for accommodating said cutting filament;
   said cutting filament extending from said outer face of said base body through said opening to said inner region;
   said inner region being arranged radially within said clamping arrangement with respect to the rotational axis;
   a shield element disposed in said inner region and defining a wind shadow;
   said cutting filament having a segment running in said inner region; and,
   said segment being arranged in said wind shadow of said shield element with respect to the rotational direction.

2. The cutterhead of claim 1, wherein:
   said segment of said cutting filament has a leading longitudinal side during operation; and,
   said shield element is arranged adjacent to said leading longitudinal side of said segment.

3. The cutterhead of claim 1, wherein said shield element is a shield wall.

4. The cutterhead of claim 1, wherein:
   said lower face defines a plane;
   said base body has a peripheral wall delimiting said inner region radially outwardly with respect to the rotational axis; and,
   said peripheral wall has at least one section expanding in a direction toward said plane.

5. The cutterhead of claim 4, wherein:
   said inner region defines a circularly shaped cross-section having a diameter (a, b); and,
   said diameter (a, b) is measured perpendicularly to the rotational axis and increases in a direction toward said plane of said lower face of said base body.

6. The cutterhead of claim 1, wherein:
   said cutting filament is held on said base body via said clamping arrangement; and,
   said clamping arrangement is configured to block a movement of said cutting filament to an outer side of said base body and to allow a movement of said cutting filament in the direction of said inner region.

7. The cutterhead of claim 1, wherein:
   said base body defines a top surface of said inner region;
   said shield element and said top surface conjointly define a receptacle for said cutting filament; and,
   said receptacle defines a trailing side during operation and is at least partially open toward said trailing side.

8. The cutterhead of claim 1, wherein said segment is arranged entirely in a slipstream of said shield element with respect to the rotational direction.

9. A cutterhead for a brushcutter, the cutterhead being rotatably driveable in a rotational direction about a rotational axis during operation, the cutterhead comprising:
   a cutting filament;
   a base body having a lower face and being configured to hold said cutting filament;
   said lower face being configured to face toward the ground during operation;
   said base body defining an outer face and having an inner region open to said lower face thereof;
   said base body further having an opening for accommodating said cutting filament;
   said cutting filament extending from said outer face of said base body through said opening to said inner region;
   a shield element disposed in said inner region and defining a wind shadow;
   said cutting filament having a segment running in said inner region;
   said segment being arranged in said wind shadow of said shield element with respect to the rotational direction;
   said shield element having a lower edge facing said lower face of said base body;
   said cutting filament defining a longitudinal direction; and,
   said lower edge and said longitudinal direction conjointly defining an angle of at most approximately 30°.

10. A cutterhead for a brushcutter, the cutterhead being rotatably driveable in a rotational direction about a rotational axis during operation, the cutterhead comprising:
    a cutting filament;
    a base body having a lower face and being configured to hold said cutting filament;
    said lower face being configured to face toward the ground during operation;
    said base body defining an outer face and having an inner region open to said lower face thereof;
    said base body further having an opening for accommodating said cutting filament;

said cutting filament extending from said outer face of said base body through said opening to said inner region;
a shield element disposed in said inner region and defining a wind shadow;
said cutting filament having a segment running in said inner region;
said segment being arranged in said wind shadow of said shield element with respect to the rotational direction;
said shield element having a lower edge facing said lower face of said base body;
said lower face of said base body defining a plane;
said lower edge and said plane conjointly defining a distance (o) therebetween;
said segment of said cutting filament and said lower face conjointly defining a distance (p) therebetween; and,
said distance (o) defined between said lower edge and said plane being less than said distance (p) defined between said segment and said lower face.

11. The cutterhead of claim 10, wherein:
said cutting filament has a leading longitudinal side with respect to the rotational direction;
said leading longitudinal side and said shield element conjointly define a distance (c, k, m) therebetween; and,
said distance (c, k, m) defined between said leading longitudinal side and said shield element is at most five times the difference between said distance (p) defined between said segment and said lower face and said distance (o) defined between said lower edge and said plane.

12. A cutterhead for a brushcutter, the cutterhead being rotatably driveable in a rotational direction about a rotational axis during operation, the cutterhead comprising:
a cutting filament;
a base body having a lower face and being configured to hold said cutting filament;
said lower face being configured to face toward the ground during operation;
said base body defining an outer face and having an inner region open to said lower face thereof;
said base body further having an opening for accommodating said cutting filament;
said cutting filament extending from said outer face of said base body through said opening to said inner region;
a shield element disposed in said inner region and defining a wind shadow;
said cutting filament having a segment running in said inner region;
said segment being arranged in said wind shadow of said shield element with respect to the rotational direction;
said base body having a side facing away from said lower face;
said inner region being delimited with respect to said side facing away from said lower face by a top surface;
said top surface having a spiral-shaped section arranged ahead of said shield element and bordering on said shield element;
said lower face defining a plane; and,
said plane defined by said lower face and said top surface conjointly defining a distance (e, f, g, h, i) therebetween which increases in the rotational direction in said spiral-shaped section.

13. The cutterhead of claim 12 comprising:
two cutting filaments arranged at an angular distance ($\gamma$) to each other;
said spiral-shaped section extending over an angular region ($\alpha$, $\beta$) about the rotational axis; and,
said angular region ($\alpha$, $\beta$) being at least 30% of said angular distance ($\gamma$).

14. A cutterhead for a brushcutter, the cutterhead being rotatably driveable in a rotational direction about a rotational axis during operation, the cutterhead comprising:
a cutting filament;
a base body having a lower face and being configured to hold said cutting filament;
said lower face being configured to face toward the ground during operation;
said base body defining an outer face and having an inner region open to said lower face thereof;
said base body further having an opening for accommodating said cutting filament;
said cutting filament extending from said outer face of said base body through said opening to said inner region;
a shield element disposed in said inner region and defining a wind shadow;
said cutting filament having a segment running in said inner region;
said segment being arranged in said wind shadow of said shield element with respect to the rotational direction;
said inner region having a first diameter (a) at said lower face of said base body;
said shield element having a lower edge facing said lower face;
said inner region having a second diameter (b) at said lower edge of said shield element; and,
said first diameter (a) being at least approximately 120% of said second diameter (b).

15. A cutterhead for a brushcutter, the cutterhead being rotatably driveable in a rotational direction about a rotational axis during operation, the cutterhead comprising:
a cutting filament;
a base body having a lower face and being configured to hold said cutting filament;
said lower face being configured to face toward the ground during operation;
said base body defining an outer face and having an inner region open to said lower face thereof;
said base body further having an opening for accommodating said cutting filament;
said cutting filament extending from said outer face of said base body through said opening to said inner region;
a shield element disposed in said inner region and defining a wind shadow;
said cutting filament having a segment running in said inner region;
said segment being arranged in said wind shadow of said shield element with respect to the rotational direction;
a stop;
said cutting filament having a first end projecting into said inner region; and,
said first end bearing against said stop.

* * * * *